Dec. 30, 1958     H. O. GUMMERE ET AL     2,866,474
AIR SUPPLY SYSTEM FOR PNEUMATIC TOOLS
Filed July 20, 1955                                     11 Sheets-Sheet 1
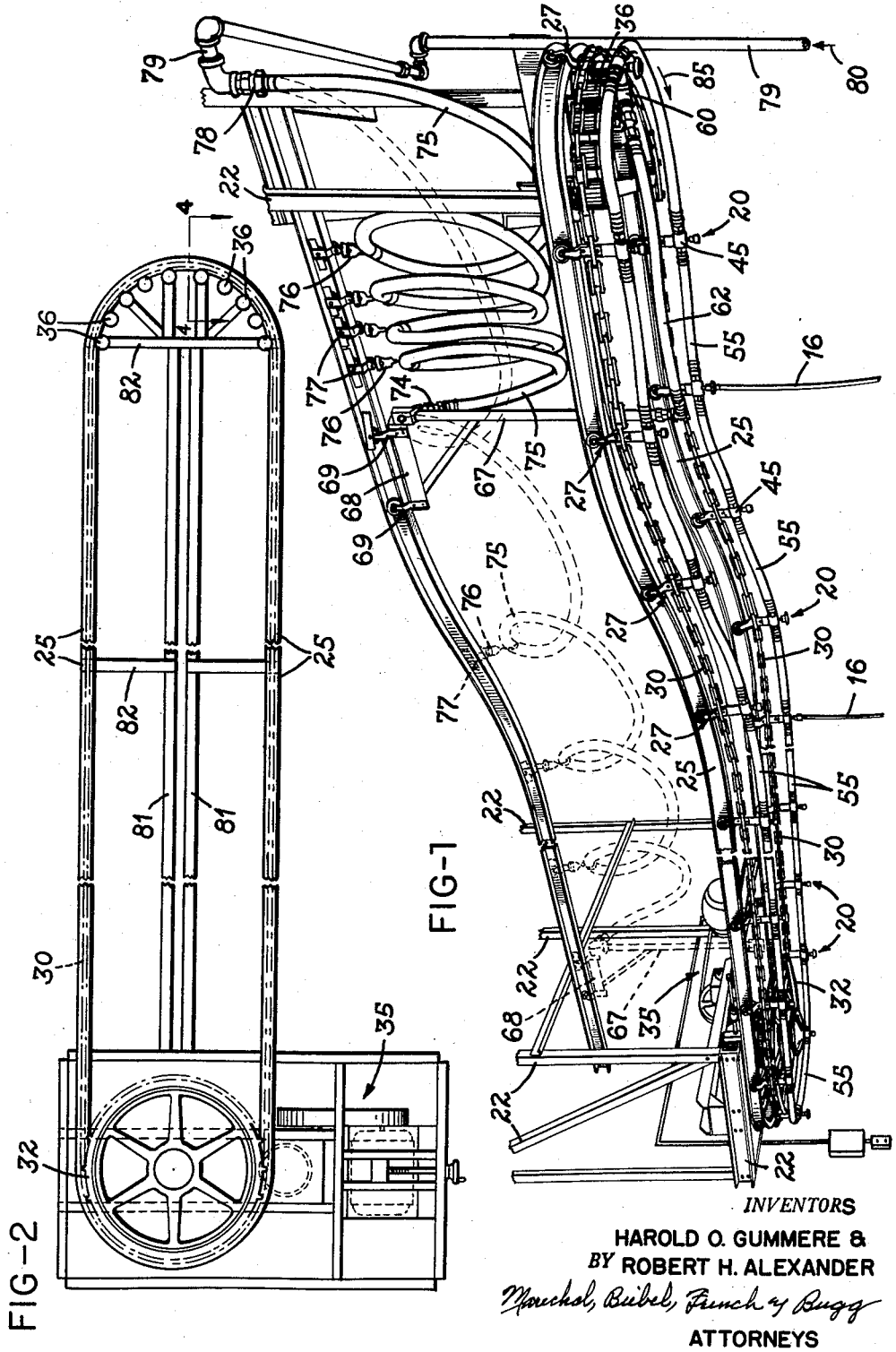
INVENTORS
HAROLD O. GUMMERE &
BY ROBERT H. ALEXANDER
ATTORNEYS

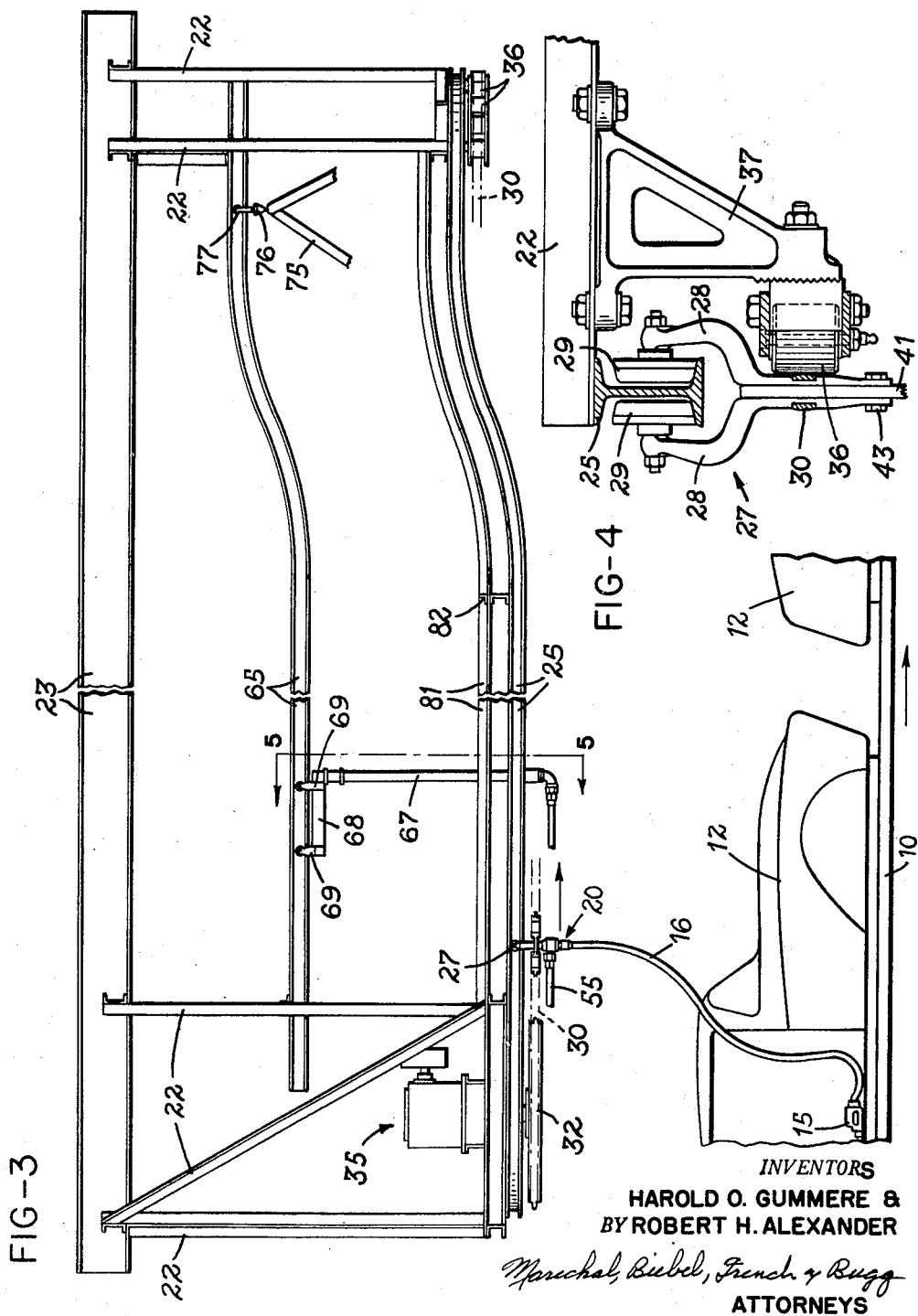

Dec. 30, 1958
H. O. GUMMERE ET AL
2,866,474
AIR SUPPLY SYSTEM FOR PNEUMATIC TOOLS
Filed July 20, 1955
11 Sheets-Sheet 3
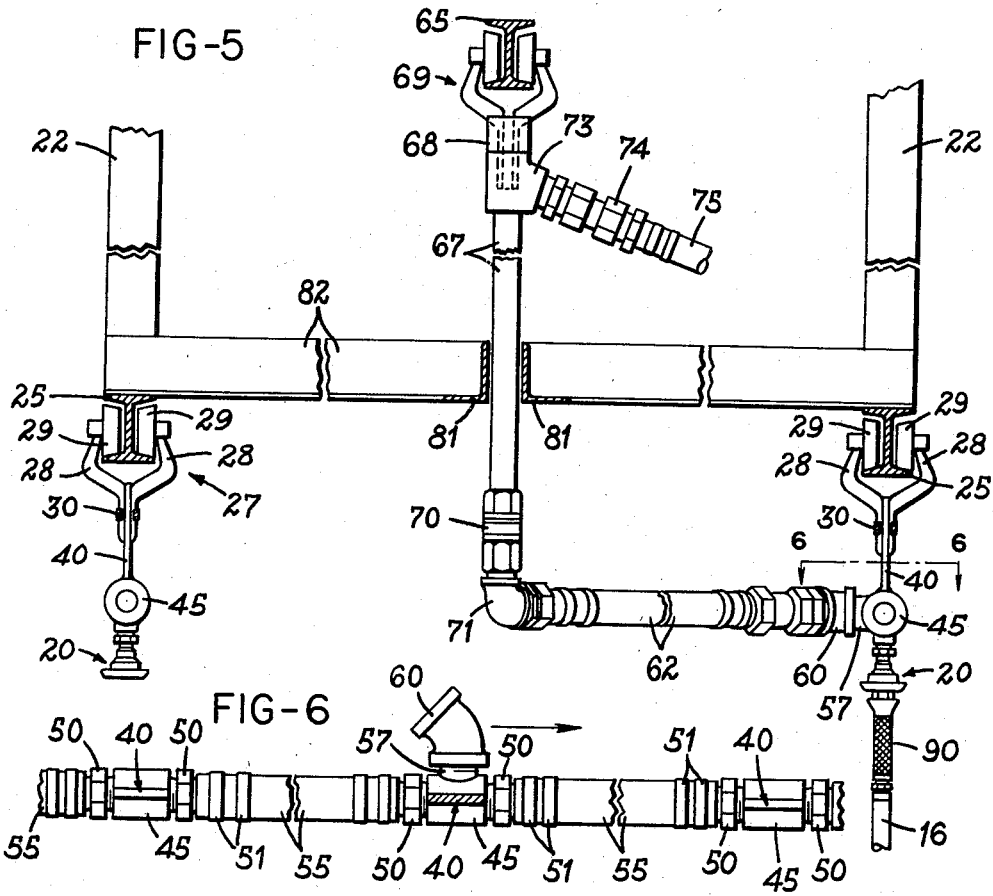
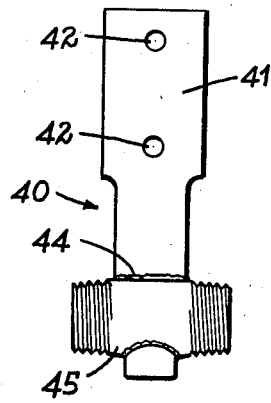
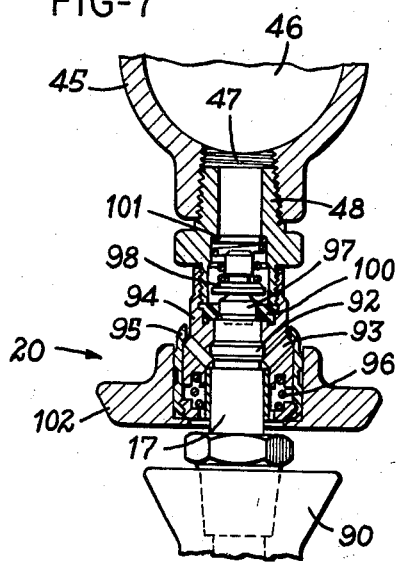
*INVENTORS*
HAROLD O. GUMMERE &
BY ROBERT H. ALEXANDER
*Marchal, Biebel, French & Bugg*
ATTORNEYS

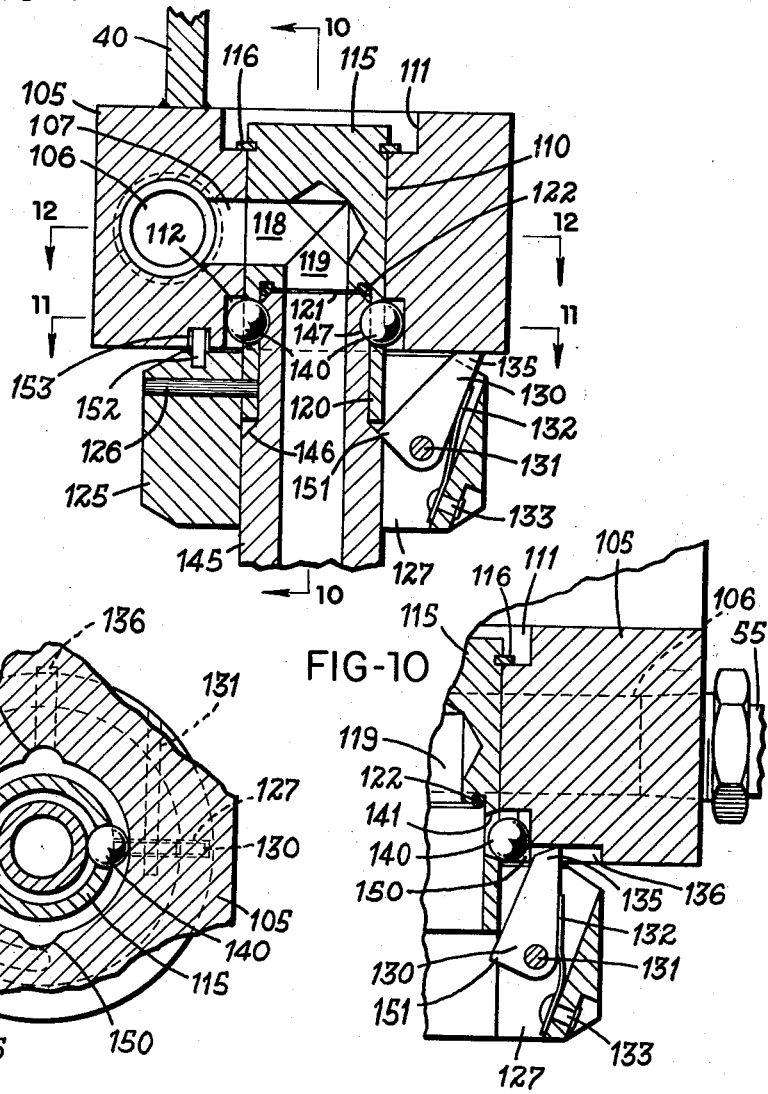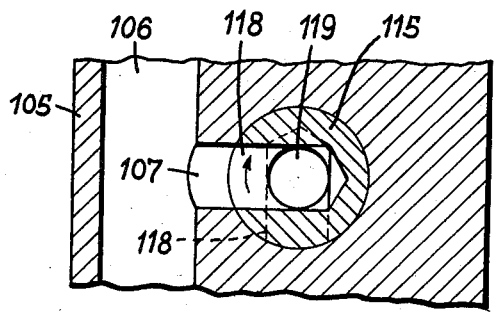

Dec. 30, 1958     H. O. GUMMERE ET AL     2,866,474
AIR SUPPLY SYSTEM FOR PNEUMATIC TOOLS
Filed July 20, 1955     11 Sheets-Sheet 5

INVENTORS
HAROLD O. GUMMERE &
BY ROBERT H. ALEXANDER

ATTORNEYS

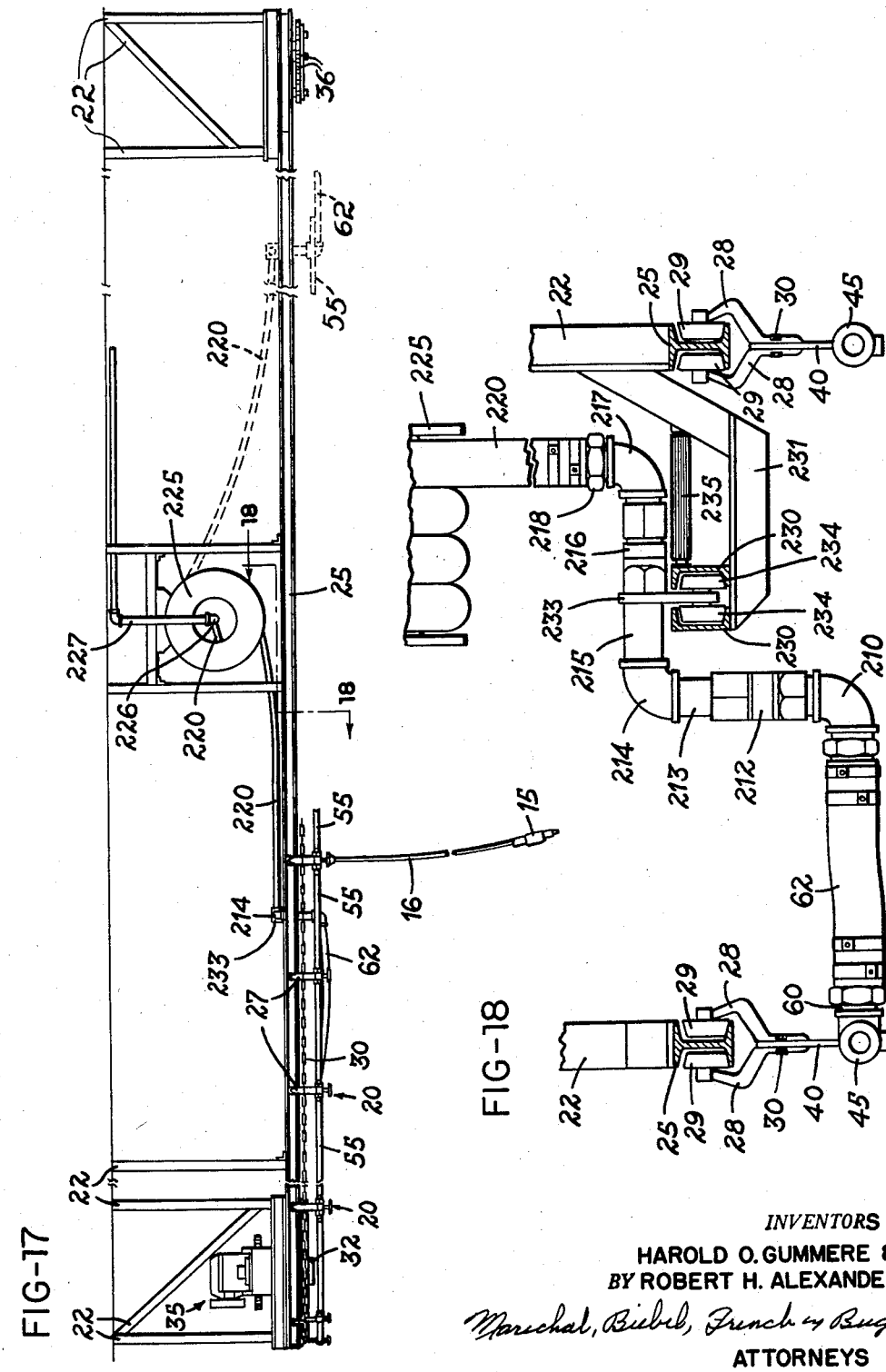

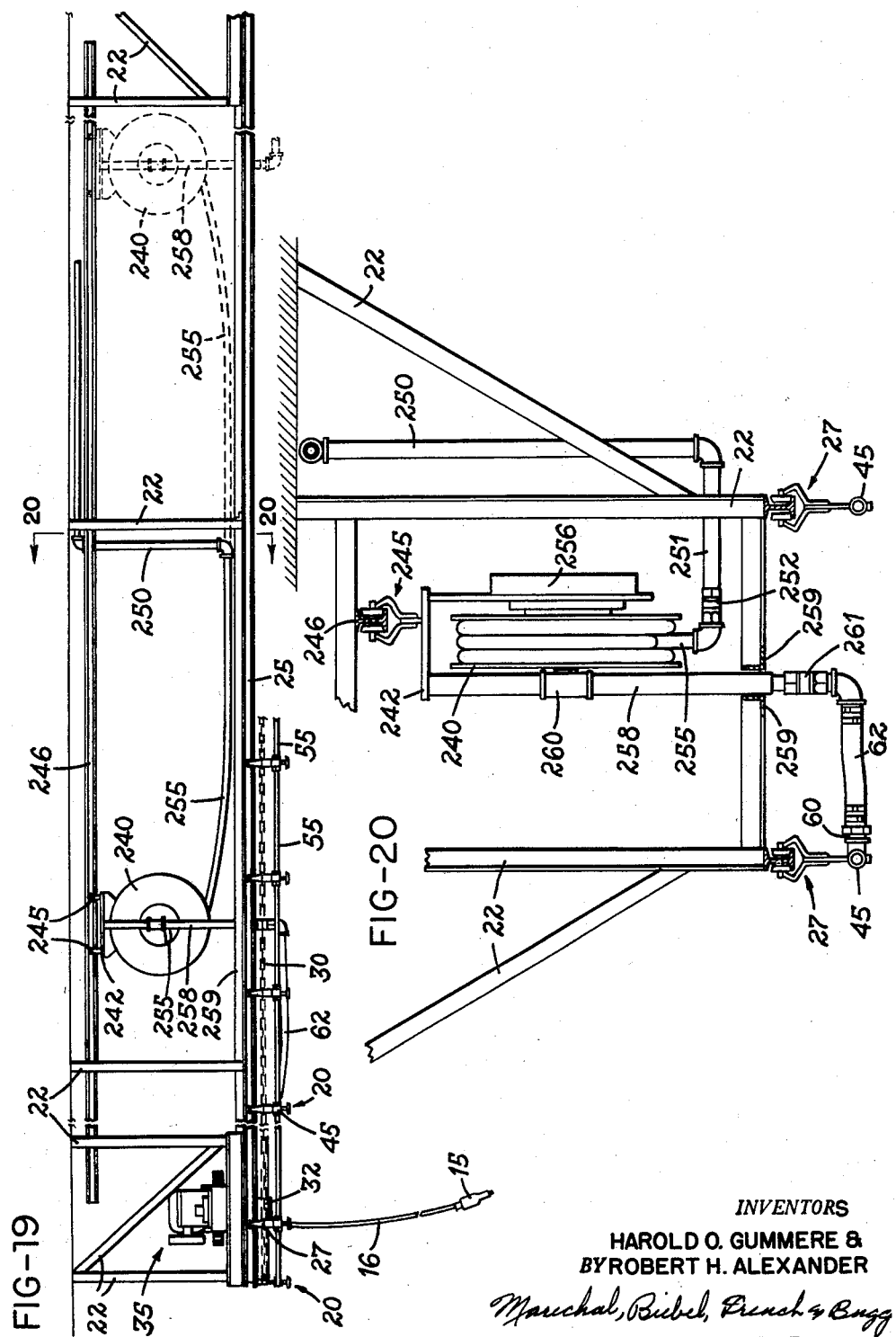

Dec. 30, 1958   H. O. GUMMERE ET AL   2,866,474
AIR SUPPLY SYSTEM FOR PNEUMATIC TOOLS
Filed July 20, 1955   11 Sheets-Sheet 8
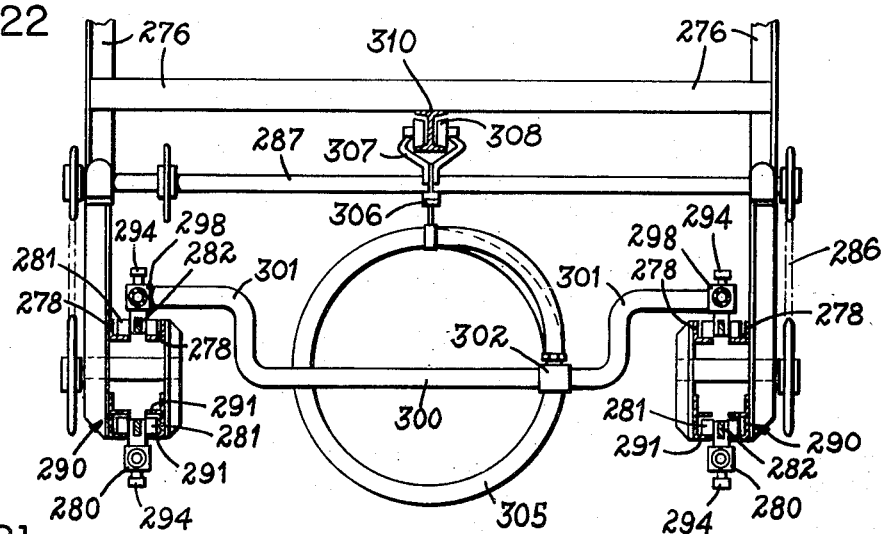
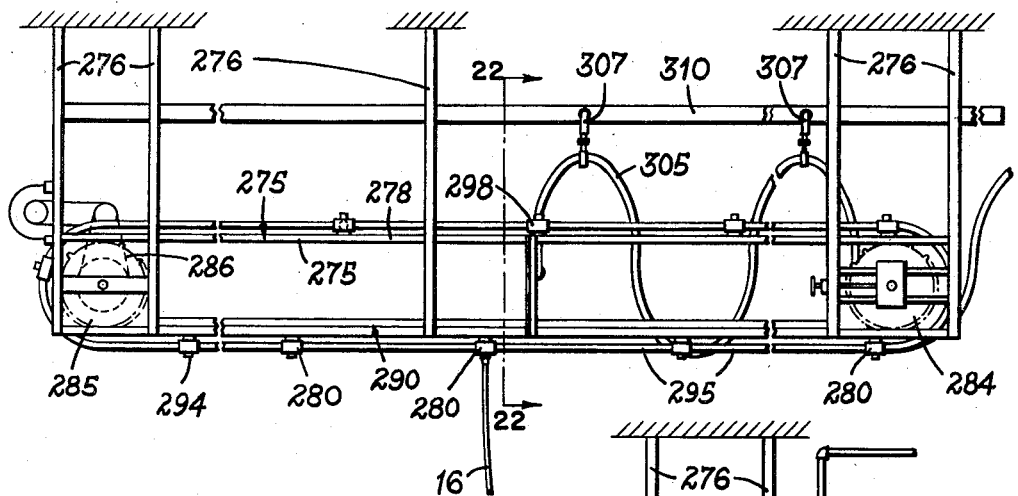
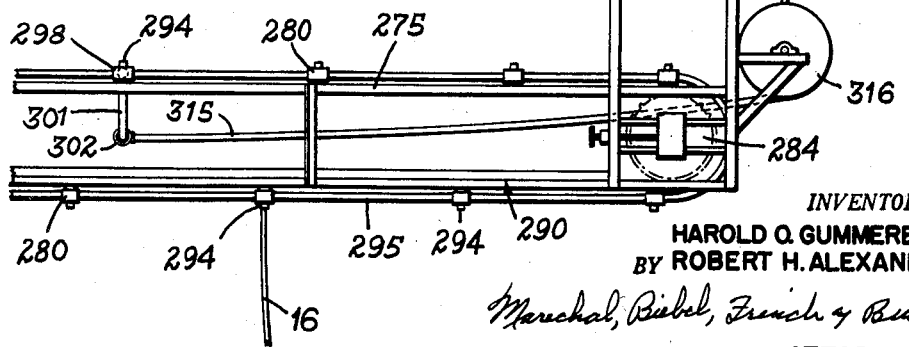
INVENTORS
HAROLD O. GUMMERE &
BY ROBERT H. ALEXANDER
ATTORNEYS Dec. 30, 1958     H. O. GUMMERE ET AL     2,866,474
AIR SUPPLY SYSTEM FOR PNEUMATIC TOOLS
Filed July 20, 1955     11 Sheets-Sheet 9

*INVENTORS*
HAROLD O. GUMMERE &
BY ROBERT H. ALEXANDER

ATTORNEYS

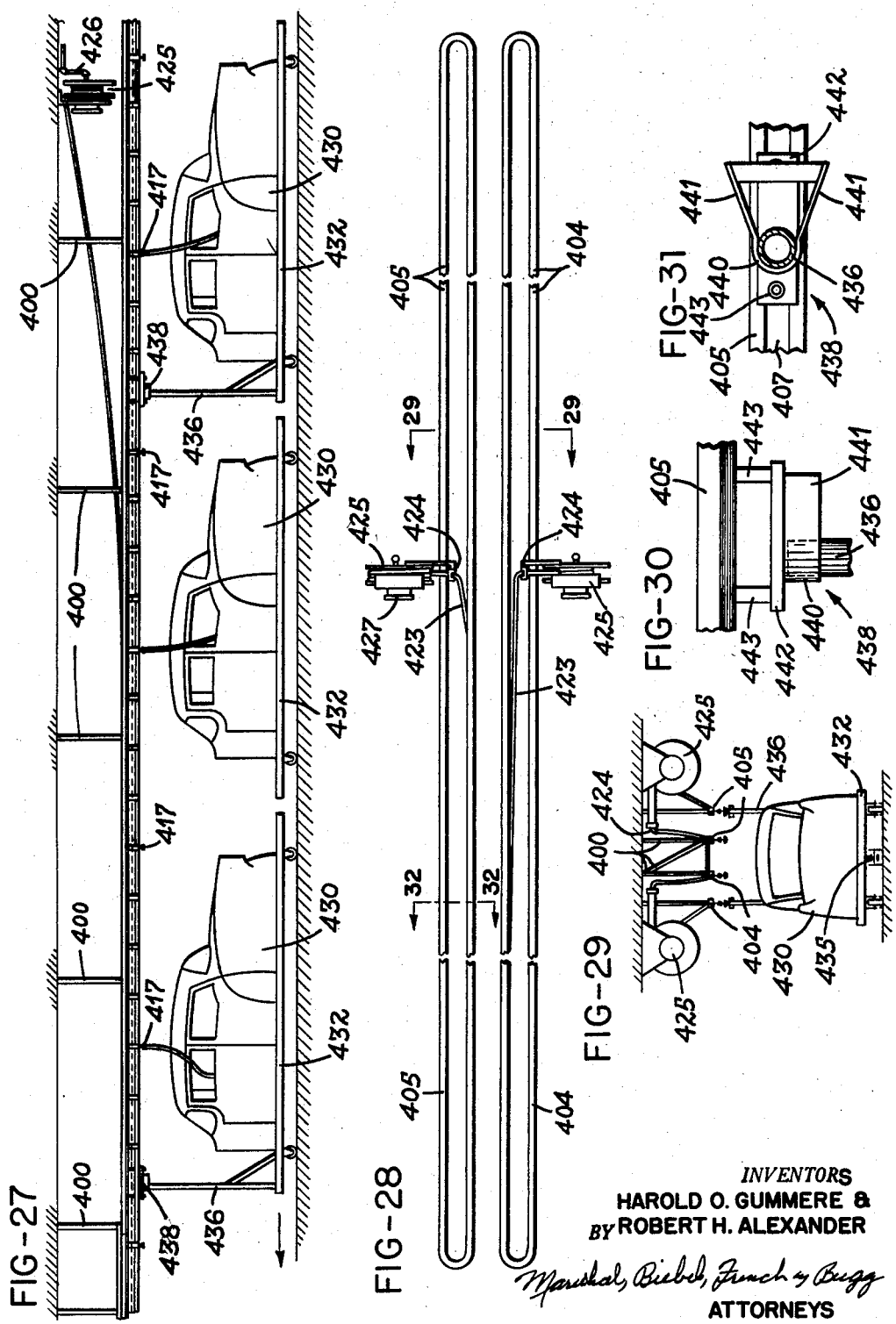

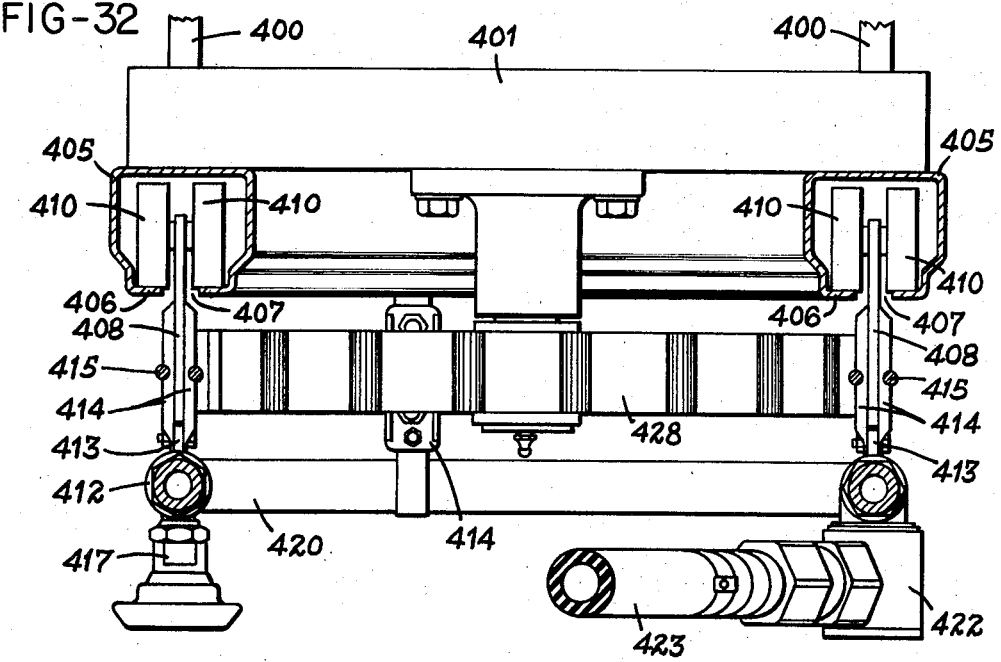

United States Patent Office 2,866,474
Patented Dec. 30, 1958

2,866,474
AIR SUPPLY SYSTEM FOR PNEUMATIC TOOLS

Harold O. Gummere and Robert H. Alexander, Dayton, Ohio, assignors to Buckeye Tools Corporation, Dayton, Ohio, a corporation of Ohio Application July 20, 1955, Serial No. 523,274

11 Claims. (Cl. 137—561)

This invention relates to systems for continuously supplying air under pressure for motivating pneumatic tools to enable use of such tools while moving along a production line.

One of the principal objects of this invention is to provide such systems to enable the use of small portable pneumatic tools having a relatively high power output for their size, on a moving production line, so that the workmen may take these tools with them as they move along with the production line. In mass production operations a number of workmen are stationed along the moving production line at various points which will be referred to herein as work stations. At each work station, as an article enters into the work station area on the moving production line, one of the workmen at that station proceeds to perform certain operations on the article, and moves along with the article as it is carried through the work station. Successive articles are operated upon by successive workmen, and as the first workman approaches the end of his work station, having completed his particular task, he returns to the head or beginning of his work station and begins working upon the next article coming along.

Thus, a number of workmen are constantly moving back and forth along the production line in each work station area, and are constantly crossing each other's paths or moving back and forth next to each other. If the tool supply hoses of their pneumatic tools were all connected to a stationary source within the work station, there would be constant difficulty in keeping these hoses from becoming entangled and intertwined. The present invention provides air supply connections moving along in correlated relation with the production line, and consequently with the workmen as they pass down their work station. Each workman may take with him a pneumatic tool having a relatively short air supply hose which is easily connected to and disconnected from a coupler moving along above the production line.

In accordance with the invention the air supply systems are of rugged construction, capable of withstanding the rough usage normally attendant with operations in modern factories. Furthermore, the pressure air conducting sections of the systems in accordance with the invention are readily accessible for repair and replacement, thus substantially eliminating the difficulties which would otherwise be encountered if considerable time was required to repair a broken conduit or the like while the production line was continually moving.

Another object of the invention is to provide such systems wherein connector blocks having through passageways are supported on trolleys of a conveyor track with the successive trolleys joined in spaced relation to each other into an endless chain for movement along with a portion of a moving production line in correlated relation with movement of the production line, and wherein the passageways of successive blocks are joined by sections of flexible conduit to provide an air supply loop for maintaining at each connector block a moving supply of pressure air and enabling use of pneumatic tools moving along with the production line.

A further object of this invention is to provide in such systems improved air supply means which maintain a continuous connection between a primary air connection in the loop and a stationary source of pressure air for maintaining pressure air at quick acting couplers on each connector block, and thereby afford a plurality of motive fluid supplies moving along with the production line.

An additional object of the invention is to provide in such systems an improved type of quick acting coupler which cannot be turned on to provide for passage of pressure air through the coupler unless a hose nipple of a pneumatic tool supply hose is in place within the coupler, and which coupler also includes a locking means for retaining the nipple within the coupler so long as supply of pressure air is maintained through the coupler.

Other objects and advantages of the invention will be apparent from the following description, the accompanying drawings and the appended claims.

In the drawings:

Fig. 1 is a perspective view of an air supply system provided by the invention;

Fig. 2 is a bottom view of the system in Fig. 1;

Fig. 3 is a side view of the system in Fig. 1;

Fig. 4 is a partial true section along line 4—4 of Fig. 2;

Fig. 5 is an enlarged section along line 5—5 of Fig. 3;

Fig. 6 is a detail section along line 6—6 of Fig. 5;

Fig. 7 is a detail view, partly in section and partly in elevation, of the quick-disconnect coupler and hose nipple seen in Fig. 5;

Fig. 8 is a detail view of one of the trolley hangers and connector blocks shown in Figs. 5 and 6;

Fig. 9 is a section through a modified quick-disconnect coupler and connector block which may be used in place of the coupler shown in Fig. 7;

Fig. 10 is a partial section along line 10—10 of Fig. 9;

Fig. 11 is a section along 11—11 in Fig. 9;

Fig. 12 is a section along 12—12 in Fig. 9;

Fig. 17 is a view in side elevation of another air supply system similar to that shown in Figs. 1–3, having a modified type of primary air supply;

Fig. 18 is a section along line 18—18 of Fig. 17;

Fig. 19 is a side view of another modified air supply system similar to that shown in Fig. 17;

Fig. 20 is a true section along 20—20 in Fig. 19;

Fig. 21 is a side elevation of a modified air supply system wherein two air supply loops are provided operating in parallel vertical planes and having a common primary air supply;

Fig. 22 is a section along 22—22 of Fig. 21 showing details of the common primary air supply;

Fig. 23 is a partial side elevation showing a modified primary air supply which may be used in the system shown in Figs. 21 and 22;

Fig. 27 is a side view of another modified air supply system wherein two air supply loops are provided operating in a common horizontal plane and adjacent each other;

Fig. 28 is a schematic top plan view of the system of Fig. 27;

Fig. 29 is a section along line 29—29 of Fig. 28;

Figs. 30 and 31 are enlarged detail views of the propelling mast and socket arrangement which may be used for driving the system of Fig. 27;

Fig. 32 is an enlarged detail section taken on line 32—32 of Fig. 28;

Fig. 33 shows a modified track and trolley arrangement which may be incorporated in the system of Fig. 28; and Fig. 34 is a side view in elevation of the trolley and track seen in Fig. 33.

Figure 13:
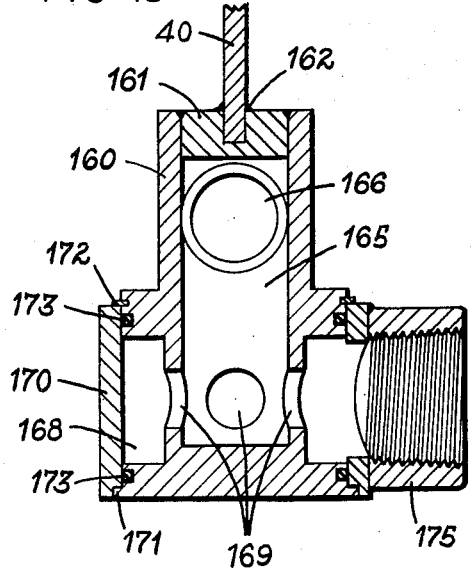
Fig. 13 is a section through a modified primary air connection which may be used in place of the primary air connection shown in Figs. 5 and 6.

Referring to the drawings, which illustrate preferred embodiments of the present invention, Figs. 1, 2 and 3 show the overall arrangement of one air supply system provided in accordance with the invention. The entire system is adapted to be mounted extending along a portion of a moving production line, referred to as a "work station." Such a work station is one area along the length of the production line within which certain operations are performed upon articles carried along a moving production line during the course of their manufacture. As one example of such an arrangement, Fig. 3 shows, in a general manner, a production line conveyor 10 carrying an automobile body 12 upon which certain operations are to be performed as the body is carried through the work station.

The production line conveyor 10 may be advanced continuously or intermittently, depending upon the nature of the operations to be performed, and during such movement of the articles on the production line a workman, taking one or more pneumatic tools 15 with him, will move along with the production line and perform certain operations upon the article. For instance, in the example of Fig. 3, a workman may drill a series of holes in the automobile body 12.

Each tool 15 has an individual air supply hose 16 at the end of which there is a nipple 17 (Fig. 7) for connection with a quick acting coupler, a plurality of which are indicated generally at 20. In accordance with the invention these couplers are moved along in correlated relation with the production line conveyor 10, and are continuously supplied with pressure air for use as motive fluid in the tools 15.

Referring to Fig. 1, the system includes a plurality of support beams 22 which may be suitably suspended from the ceiling of a factory, as shown generally by the large horizontal beam 23 in Fig. 3. Supported by beams 22 is a continuous track 25 in the form of an I-beam shaped to provide an elongated closed loop or flat-sided oval, one side of which extends along and substantially parallel to the production line conveyor 10. The track 25 follows the path of the production line conveyor through changes in elevation and/or direction in the portion of the track which extends parallel to the conveyor, as shown by the change in elevation between opposite ends of the track 25 in Figs. 1 and 3.

A plurality of trolley members 27 are arranged to move along the track 25. Each trolley member includes (Figs. 4 and 5) complementary arms 28 having wheels 29 at the upper inner end thereof in rolling engagement with the track 25. The arms 28 are thus supported against any substantial vertical movement relative to track 25, by reason of the contact between wheels 29 with either the upper or lower horizontal portions of the I-beam track 25. Also, the provision of a wheel on each side of the track prevents any substantial movement of the trolley in a lateral direction with respect to the track. Thus, the trolley members are supported for movement along track 25 and are retained against any substantial movement in any other direction wtih respect to the track.

The lower portions of arms 28 are notched to be received within a link of a conveyor chain 30 which connects the successive trolleys 27 together for conjugate movement along track 25. At one end of the track loop a horizontally mounted sprocket wheel 32 (Fig. 2) meshes with chain 30, and suitable drive mechanism indicated generally at 35 is connected for rotating sprocket 32 to drive chain 30 in correlated relation with production line conveyor 10. At the other end of the track loop a plurality of rollers 36 are supported for free rotation around a vertical axis by mounting brackets 37 (Fig. 4). Rollers 36 engage chain 30 as it passes around the end of the track loop and guide the chain smoothly around to the other side of the loop.

Hanger members 40, one of which is shown in detail in Fig. 8, are rigidly suspended from trolleys 27 by an upper portion 41 having a pair of apertures 42. Suitable clamping bolts 43 pass through the arms 28 of the trolley member (see Fig. 4) and hold the hanger in sandwiched assembly between the arms of the trolleys. The lower end of each hanger member is attached, as by welding 44, to a connector block 45 having a transverse through passage 46 (Fig. 7). Each connector block 45 is similar to a T-connection in that a branch passageway 47 opens into through passage 46, and the branch passage is suitably threaded for connection to the upper threaded plug 48 of a coupler 20. The outer ends of each plug 45 are also threaded to receive hose connection adapters 50 which include a ferruled portion in the usual manner for extension into the end of a flexible hose or conduit to provide a clamping surface against which the walls of the conduit are compressed by hose clamps 51. In this manner sections of flexible air conduit 55 are attached between successive connector blocks 45 to provide a continuous air supply conduit forming an air supply loop suspended beneath track 25 and movable along the length of the track in accordance with driving movement of chain 30. Furthermore, the individual conduit sections 55 are relatively short and readily accessible to facilitate repair and replacement.

One of the connector blocks 45 includes a lateral boss 57 (Figs. 5 and 6) to which is connected an elbow providing a primary air connection 60, and a length of flexible conduit 62 is connected thereto and extends inwardly toward the center of the loop of track 25. A length of straight track 65 is supported from beams 22 to extend lengthwise of the track loop, as shown in Figs. 1 and 3, and a boom or pipe 67 is supported for movement along tarck 65 by a carrier 68 including suitable trolleys 69 traveling along track 65. This assembly provides an air supply boom which is thus mounted for travel back and forth along the length of the track loop during operation of the system. At the lower end of pipe 67 there is a swivel connection 70 having a 90° elbow 71 connecting its lower end to conduit 62.

At the upper end of pipe 67 is a connector 73 including a conduit connection 74 which is attached to one end of a length of flexible air supply conduit 75. The conduit 75 is helically coiled, as shown in Fig. 1, and the top of each coil is provided with swivel hanger 76 connected to a trolley 77 running along track 65. The other end of conduit 75 is connected at 78 to a stationary air supply pipe 79 which is in turn connected to a source of pressure air indicated generally by arrow 80 in Fig. 1. This source may be any convenient pressure air supply used in the factory, for example, a motor driven compressor. As the air supply boom moves along track 65 it is guided adjacent its lower end by angle members 81 mounted to extend parallel and beneath rail 65 by suitable cross beams 82.

In operation, the drive 35 is energized to rotate sprocket 32 at a speed such that chain 30 will move in correlated relation with production line conveyor 10. The trolleys 27 then move along track 25 in accordance with movement of chain 30, and likewise connector blocks 45 and conduit sections 55. The primary air connection 60 travels along the length of track 25 in the direction of arrow 85, and conduit 62 is pulled along behind the primary air connection. As the connection 60 passes around the ends of the track loop swivel connection 70 turns, and as the primary connection 60 moves along one of the sides of the loop, a pull is transmitted through conduit 62 to move the supply boom along track 65, with resultant expansion and contraction of the coil of supply conduit 75, as shown in dotted lines in Fig. 1.

In order to connect into the air supply loop, the workman grasps the hilt 90 at the end of his tool supply hose 16 and thrusts the nipple 17 into a coupler 20, which is retained against any substantial vertical movement, as explained above. Referring to Fig. 7, the connection of the tool supply hose into the moving air supply loop takes place as follows. The nipple includes a shoulder 92 which pushes past a series of pins 93 set angularly in the coupler body 94. These pins move upwardly and outwardly, as viewed in Fig. 7, against a shoulder on a sleeve 95, and this sleeve moves axially with respect to body 94, compressing a spring 96. Once the shoulder 92 passes pins 93, the force of spring 96 urges the sleeve 95 downwardly and thrusts the pins into locking engagement as shown. The end of nipple 17 engages a spider 97 and through it urges valve 98 away from seat 100 against the force of a spring 101.

A wide adapter ring 102 is press fitted about the sleeve 95, and to disconnect the workman merely pushes upwardly upon the adapter 102, thereby freeing pins 93 for sliding movement outwardly, and pulls upon hilt 90 to withdraw nipple 17. The spring 101 immediately seats valve 98 and prevents loss of pressure air from the coupler.

Referring to Figs. 9–12, a modified type of coupler is shown which may be used in place of couplers 20. A connector block 105 is provided for attachment to the hanger strap 40 in place of a block 45. Block 105 includes a transverse bore 106 arranged for connection with the lengths of flexible conduit 55, and a branch passage 107 terminating in a bore 110 which extends vertically through block 105 and includes an upper counterbored portion 111 and a lower counterbored portion providing an annular recess 112. A cylindrical plug 115 extends through bore 110 and is held in place by a snap ring 116. Within plug 115 is a horizontal passage 118 communicating with a vertical passage 119. A lower enlarged portion 120 of plug 115 terminates in a seat 121 about which is placed an O-ring sealing member 122. A collar 125 is fastened to the lower end of plug 115 by a pin 126, and includes a recessed portion 127 carrying a pawl 130 mounted for rocking movement about a shaft 131 under the force of a spring 132, which is in turn fastened at one end to collar 125 by a rivet 133. The upper end 135 of the pawl is thus adapted to be urged into a slot 136 in the lower face of block body 105, and the angular position of slot 136 with respect to rotation of plug 115 is such that when the pawl extends within the slot, passages 107 and 118 are turned out of alignment, as shown by the dotted lines in Fig. 12, and pressure air cannot pass from passage 106 into the plug.

A plurality of balls 140 are mounted within holes 141 in plug 115 for radial movement with respect to the plug in counterbore 112, and for locking engagement with a tool supply hose nipple. The nipple, indicated at 145, has a reduced upper section providing a shoulder 146 and includes an annular recess 147 of generally semi-circular cross-section. In the "off" or closed position of the coupler the balls 140 may move radially outwardly into niches 150 in the walls of counterbore 112, and in this retracted position of the balls the nipple may be thrust into sealing engagement with O-ring 122. Insertion of the nipple causes shoulder 146 to engage the lower corner 151 of pawl 130, and rock the pawl outwardly of slot 136. The collar 125 may then be rotated, as indicated by the direction of the arrow in Fig. 12, and such rotation will cause balls 140 to cam radially inwardly into locking engagement with recess 147 on the nipple, thus locking the nipple to the coupler as the air supply is turned on by alignment of passages 107 and 118. A pin 152 extending upwardly from collar 125 and sliding within an arcuate slot 153 in the bottom of block 105 limits the rotational movement of plug 115 to approximately 90° between closed and open positions.

Referring to Fig. 13, a modified swivel-type primary air connection is shown which may be used in the system of Fig. 1 in place of the connection 60. In this connection there is no branch passage for attachment of a quick-disconnect coupler and therefore, it is advisable to insert this modified primary air connection in the system as an extra unit having its own trolley, and spaced between two successive connector blocks 45. The modified primary air connection includes a main body 160 closed at its upper end by a plug 161 having a slot in its top for receiving the end of a hanger member 40, with the hanger member permanently attached by a weld 162. A central chamber 165 extends through body 160, and transverse passages 166 open into the chamber for connection with conduit sections 55 of the system. The lower end of body 160 includes an annular recess 168 connected by a plurality of apertures 169 with chamber 165. Surrounding recess 168 is a sleeve 170 resting upon a shoulder 171 at the bottom of the main body, and held in place at its top by a snap ring 172. Suitable O-ring sealing members 173 carried by the body 160 provide an air-tight seal between recess 168 and sleeve 170. An internally threaded connector 175 is fixed to one side of sleeve 170, opening into recess 168, and, through openings 169, into chamber 165 to provide a flow of pressure air into the air supply loop of the system. When installed in the system of Fig. 1, the flexible conduit 62 is attached to the connector 175 for supply of pressure air from the main air supply boom.

Figure 14:
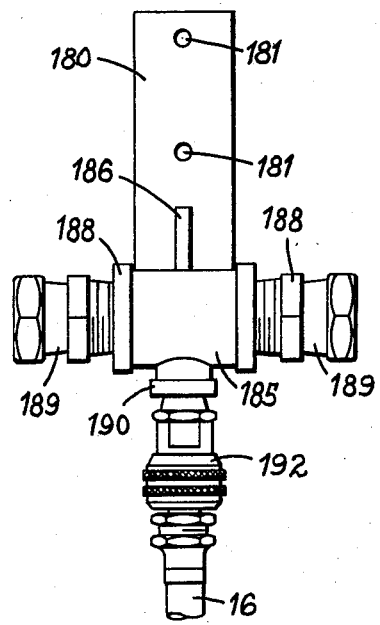
Figs. 14 and 15 are detail views of a modified hanger and connector block which may be used in the systems provided by the invention.
Figure 15:
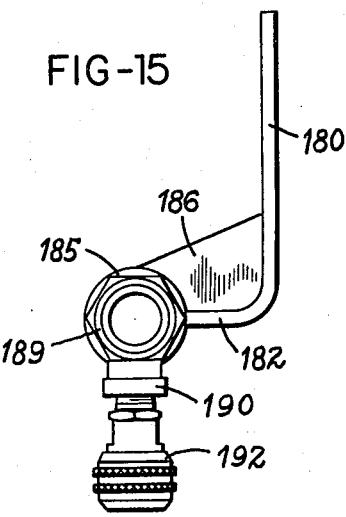

Figs. 14 and 15 show a modified hanger and connector block assembly which may be used in place of hanger 40 and block 45. This assembly includes a hanger 180 having apertures 181 in its upper portion for connection with trolleys 27, and having a right angle bend in its lower portion providing a generally horizontal leg 182 (Fig. 15) which is welded to the side of a modified connector block 185. A reinforcing plate 186 is secured between the upright part of hanger 180, the horizontal section 182, and the entire adjacent upper side of connector block 185 to provide a rigid assembly. The modified connector block 185 includes opposite internally threaded sections 188 for receiving externally threaded conduit connectors or adapters 189. An internally threaded branch connection 190 receives a quick acting coupler 192 which is of the same internal construction as coupler 20, and differs therefrom only in that the adapter ring 102 has been omitted. For release of the coupler the workman presses upwardly directly upon the sleeve of the coupler.

Figure 16:
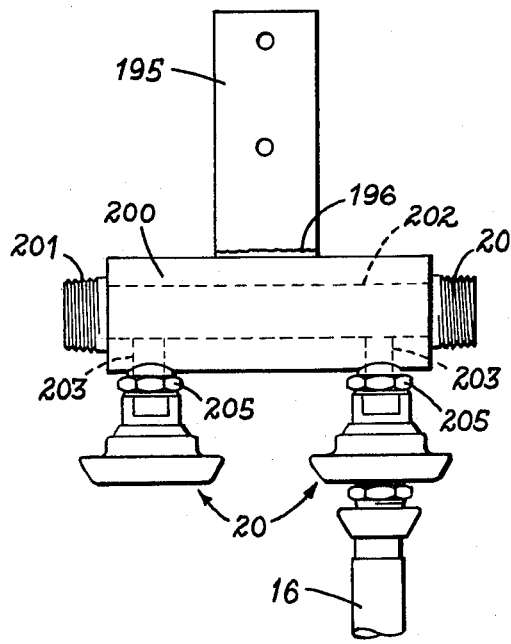
Fig. 16 is a detail view of another modified connector block and hanger having a plurality of quick-disconnect couplers.

In Fig. 16 another modified hanger and connector block assembly is illustrated, including a short vertical strap 195 welded at 196 to an elongated connector block 200. Block 200 includes externally threaded end portions 201 for connecting conduit sections 55 to a through passage 202 in body 200. A pair of branch passages 203 extend into passage 202 and terminate in adapters 205 for receiving quick acting couplers of the same type as illustrated at 20 in Fig. 7. This modified hanger and connector block assembly is particularly useful in a system such as in Fig. 1 when a workman is required to carry more than one pneumatic tool, or when the workmen must operate in pairs, each carrying a tool.

A modified air supply system similar to the system shown in Figs. 1–3, is shown in Figs. 17 and 18. Here the same horizontal air supply loop structure is employed, and accordingly, like reference numerals are used to indicate like parts. The modification of Figs. 17 and 18 concerns particularly another type of primary air supply system which may be advantageously employed in certain installations. The flexible conduit 62 extending from primary air connection 60 is attached to an elbow 210 which depends from a full-swivel pipe connection 212. This swivel is at the bottom of a short boom assembly including pipe section 213, a right angle elbow 214, and a short horizontal pipe 215 attached to another full-swivel connection 216. The other end of swivel connection 216 includes a right angle elbow 217 having a flexible conduit adapter 218 thereon clamped to the end of a length of flexible air supply conduit 220. A reel including drum 225 is mounted by transverse beams 226 at the center of the loop of track 25. Drum 225 is mounted for revolving movement about its longitudinal axis, which is arranged transversely above track 25, and adjacent the axis of drum 225 is a swivel connection shown generally at 226 and in turn connected to an air supply pipe 227 at one side, and to one end of conduit 220 at its other side. The conduit 220 is adapted to be coiled about drum 225, and suitable motor means such as a spring (not shown) is included in the reel structure for urging the drum to rotate in a direction to wrap conduit 220 about the drum. As the primary air connection 60 moves about the air supply loop, along track 25, the flexible conduit 220 is paid out from or retracted about drum 225 in accordance with movement of the boom structure shown in Fig. 18. The dotted position of conduit 220 in Fig. 17 serves to illustrate the manner in which the conduit is paid out in opposite directions from the drum.

In order to support the boom structure during its extended movement longitudinally of the track loop, a pair of opposed track members 230 are supported by suitable bracing 231 from one of the support beams 22. A trolley 233 is attached to pipe section 215 and includes wheels 234 for movement along the tracks 230. In order to prevent chafing or other damage to the flexible conduit 220 during its extended movement, a series of rollers 235 are supported between the brace 231 and the adjacent track member 230, and when the boom structure moves to an extended position away from drum 225 intermediate portions of conduit 220 will lie upon the rollers 235.

In Figs. 19 and 20 another modified primary air supply system is shown which may be used with the system of Fig. 1, and again like reference numerals are applied to like construction. In this modification a reel including a drum 240 is mounted with its rotational axis transversely above track 25. The drum is suspended from a plate 242 attached to a plurality of trolley members 245 movable along a track 246 which is supported to extend along the length of the air supply loop. Thus, the drum 240 is arranged for movement longitudinally of the system as indicated by the dotted position in Fig. 19. The stationary air supply pipe 250 is preferably arranged at a central point along one side of the track 25, and a transverse pipe 251 terminating in a swivel connection 252 extends into alignment with the drum 240. From swivel 252 a length of flexible conduit 255 extends to the drum, and a suitable spring or the like within housing 256 (Fig. 20) tends to rotate the drum in a direction to wrap conduit 255 about it.

At the other side of drum 240, suspended from plate 242, is a boom member 258 having a right angle swivel connection 260 which is attached to the other end of conduit 255. The lower end of boom 258 is guided during its movement longitudinally of the track loop by horizontal guide members 259, and a swivel connection 261 at the bottom of the boom is adapted to be attached to the flexible conduit 62 extending from the primary air supply connection 60 on the air supply loop. In operation, this modified system maintains a constant supply of pressure air to the air supply loop by movement of boom 258 along with the primary air connection 60, and the boom is continuously connected with the stationary air supply pipe 250 through the conduit 255 being reeled onto and off of the drum 240 moving along the boom.

The present invention also includes air supply systems comprising a plurality of air supply loops arranged to operate in either horizontal or vertical planes, and which may have a common primary air supply. Referring to Figs. 21 and 22, a pair of horizontal upper tracks 275 are suspended by suitable beams 276 to extend along a production line, each of these tracks including a pair of angle members having their horizontal legs 278 opposite and slightly spaced from each other. A plurality of connector blocks 280, including wheels 281 arranged to ride upon the horizontal members 278, are pulled along track 275 by suitable chains 282 which mesh with an idler sprocket 284 at one end of the system and a drive sprocket 285 at the other end. The ends of tracks 275 are tangentially aligned with sprockets 284 and 285, so that the chains pass smoothly from the ends of the tracks into mesh with the sprockets. Any suitable drive mechanism, for example, a chain indicated diagrammatically at 286, and a driven cross shaft 287, may provide power for rotating the drive sprockets 285.

At the lower end of sprockets 284 and 285, extending beneath and parallel to track 275, are lower tracks 290 each formed of four angle members having their horizontal legs 291 vertically aligned in opposite pairs to provide U-shaped track channels extending the length of the system, as seen in Fig. 22. The uppermost of legs 291 provides an abutment or backing member for wheels 281 when one of the tool hoses 16 is attached to a connector block 280 through suitable quick acting couplers 294. These couplers each open into an air supply loop including the connector blocks 280 and sections of flexible conduit 295 which join successive connector blocks into a closed air supply loop. Conduit sections 295 are readily accessible for repairs or replacement when necessary.

Both of the vertical air supply loops have primary air connectors 298 into which a common air supply boom is attached. This boom includes a central portion 300 extending transversely between the two air supply loops along a line extending through the horizontal axes of the loops. At the ends of the boom are offset leg portions 301 extending to one side of each of the air supply loops, to the primary air connectors 298. A full-swivel T connection 302 is provided on the central portion 300 of the boom and is attached to one end of a coil of flexible supply conduit 305. At the top of each loop of conduit 305 there is a swivel hanger 306 hung from a trolley 307 having wheels 308 which ride along a track 310 suitably supported to extend parallel to and somewhat above the air supply systems. In the same manner as in the system of Fig. 1, the other end of the coiled flexible conduit 305 is attached to a stationary source of pressure air, and as the air supply loops are revolved, through the drive from sprocket 285 and chain 282, the air supply boom moves back and forth along the length of the air supply systems in accordance with the travel of the primary air connectors 298, and the coil of conduit 305 is accordingly expanded and contracted. The successive couplers 294 are thereby moved along over the production line at a rate correlated with the movement of the production line, and the workmen may connect into either air supply loop.

In Fig. 23 a modified primary air supply arrangement is shown which may be used in the system of Figs. 21 and 22. Like reference numerals indicate identical parts in Fig. 23, and the swivel 302 on the boom 300 is attached to one end of a flexible supply conduit 315 adapted at its other end to be coiled about a drum or reel 316 mounted at one end of the system and urged to rotate in a direction to coil the conduit 315 about the drum. The other end of conduit 315 terminates in a swivel connection (not shown) which in turn is connected into the pressure air source 317. The operation of the modified system in Fig. 23 is the same as for that in Fig. 21, but here the air supply conduit 315 is alternately paid out from and retracted around the drum 316 in accordance with movement of the primary air connectors 298 about the system.

Figure 24:
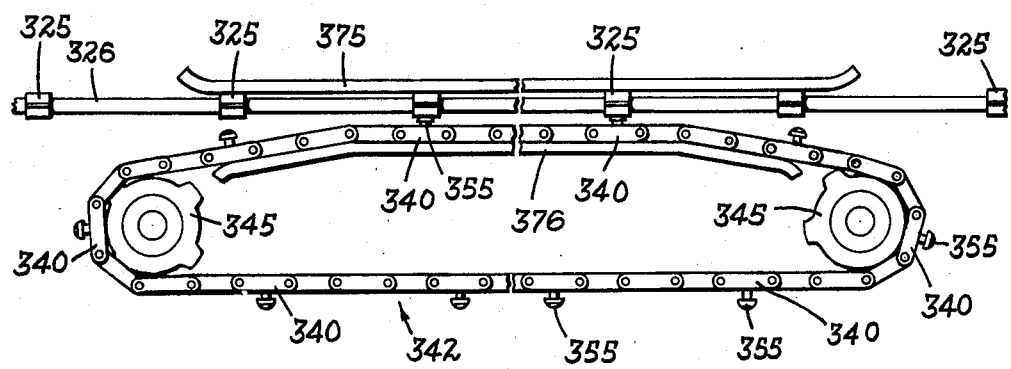
Fig. 24 is a top plan view of a modified primary air supply which may be incorporated in any of the systems provided by this invention.
Figure 25:
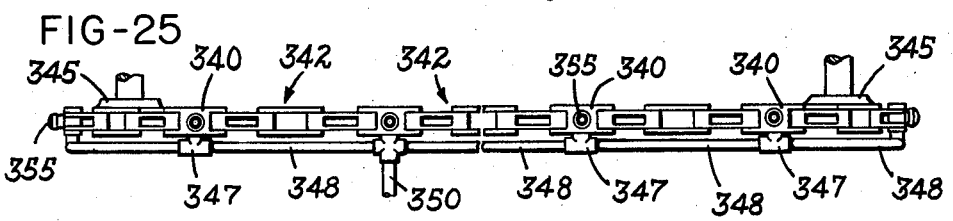
Fig. 25 is a side elevation of the device shown in Fig. 24.
Figure 26:
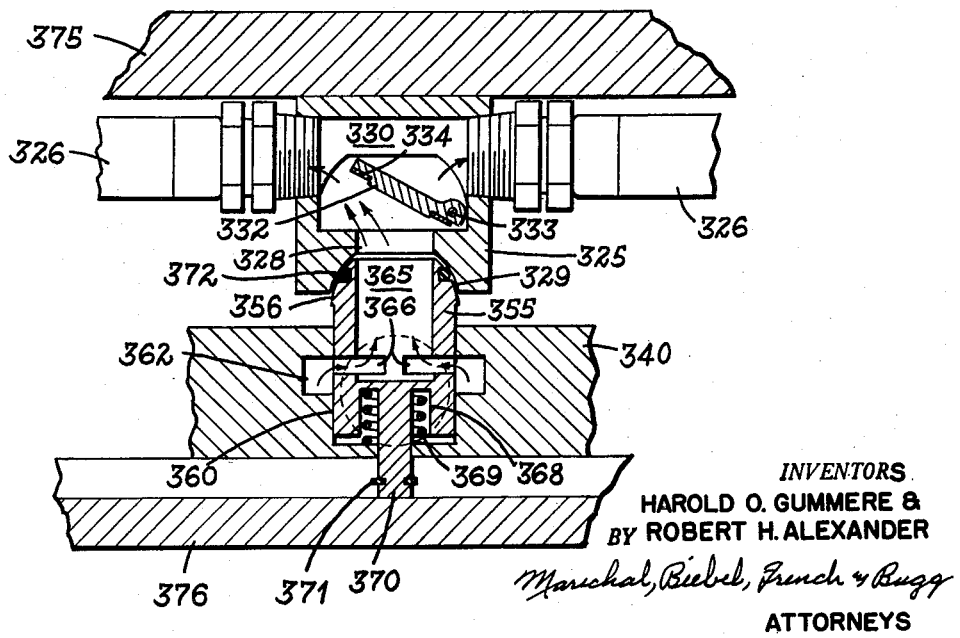
Fig. 26 is an enlarged view, partly in section and partly in plan, of one of the pressure air transfer mechanisms shown in Figs. 24 and 25.

In Figs. 24-26 there is illustrated a modified primary air supply arrangement for feeding pressure air to a loop of an air conduit such as used in any of the above described systems. Here modified connector blocks 325 are provided in the main air supply loop, connected by sections of flexible conduit 326. Referring to Fig. 26, a side wall of each of the blocks 325 is provided with an inlet bore 328 having a concave outer end 329. The inner end of bore 328 opens into the through passage 330 of block 325 through a flap-type check valve 332 pivoted at 333 to the block, and carrying a sealing ring 334 in a groove upon its face for sealing engagement around the inner end of bore 328. The valve 332 operates under differential pressure conditions such that it is normally closed by the pressure air within the air supply loop. When air is supplied at a higher pressure to bore 328 the valve opens and thus provides for flow of pressure air into the loop. In accordance with the invention a secondary air supply loop is provided including a plurality of block members 340 joined by suitable links into a closed chain 342 which travels around a pair of sprockets 345, being driven by its engagement with the main air supply conduit 326. Each of block members 340 is connected through a T 347 and conduit sections 348 into a closed secondary loop supplied through a flexible conduit 350 and a swivel connection (not shown) from a source of pressure air.

Within each block member 340 a nozzle member 355 is received within a transverse bore 360, and a slot-like passage 362 connects this bore with the T connection 347 for supply of pressure air into passage 362. A central bore 365 extends into nozzle member 355 and opens into radial slots 366 which are adapted to communicate with the passage 362 for supply of pressure air to the bore 365. An annular recess 368 in the other end of nozzle member 355 receives a spring 369 which urges the nozzle member 355 outwardly of body 340, in a direction to close the connection between slots 366 and passage 362. An extension 370 carrying a snap ring 371 projects through the other side of body 340, serving as a stop to limit outward movement of nozzle member 355 under influence of the spring.

In operation, the block members 340 and connector blocks 325 are guided into parallel movement, with convex surface 356 and concave surface 329 in engagement, O-ring 372 providing for sealing such surfaces against loss of air. Suitable guide bars 375 and 376 urge these members together, and act as backing bars to provide for secure engagement of the convex and concave surfaces. During the joining of these members the nozzle 355 is forced inwardly of block member 340 against spring 369, and pressure air is admitted from passage 362 through slots 366, bore 365, bore 328, and through valve 332 into the main loop and thus provides for opening of the valves 332. The spacing of connector blocks 325 and block members 340, and the extent of backing bars 375 and 376, are so arranged that at all times at least two nozzle members are in air feeding position, and thus there is a constant flow of pressure air from the secondary to the main air supply loops. This primary air supply system may easily be incorporated in any of the systems disclosed herein, for example, the secondary air supply loop can be arranged about one of the drive or idler sprockets in any one of the systems to maintain a continuous supply of pressure air into the main loop.

Referring to Figs. 27 and 28, another modified air supply system is shown wherein a pair of track loops are suspended in a common horizontal plane, in side-by-side relation. Suitable beams 400 and 401 are attached to tracks 404 and 405, suspending them above a production line. Each of the tracks is formed from an endless, inverted and substantially U-shaped channel including lower inwardly extending flanges 406, defining a lower longitudinal opening 407 through which trolley hangers 408 are suspended from wheels 410 riding upon flanges 406. A connector block 412 having an upwardly extending strap 413 is secured to hanger 408 by suitable connecting plates 414, and a conveyor chain 415 passes about the plates 414 to maintain a fixed relation between successive trolleys on the track, and to transmit a drive force to the trolleys to move them along the track in correlated relation with the production line. Each connector block 312 is provided with a quick acting coupler 417 in the same manner as previously described in connection with the other systems, and successive connector blocks are joined into an air supply loop by sections of flexible conduit 420.

The air supply loop also includes a primary air connector 422, which may be of the full swivel type such as previously described and illustrated in Fig. 13. A flexible primary air conduit 423 extends from primary air connector 422 through a supporting pulley arrangement 424 (Fig. 28), which is preferably arranged above the center of the track loop, and conduit 423 then passes about a reel 425 and is connected at its other end to a stationary air supply pipe 426. A spring or other motor drive, indicated generally at 427, urges reel 425 to rotate in a direction to wrap conduit 423 about the reel, and this conduit is alternately paid out from and retracted about the reel as primary air connector 422 moves along the track 405 with the air supply loop. As noted above, this modification may include two such loops arranged side by side in a common horizontal plane. Since the same air supply loop, reel, and other such equipment are duplicated for the track 404 in Fig. 28, like reference numerals have been applied to this equipment.

The chains 415 may be driven in any suitable manner such as described above, for example, in connection with Fig. 1, through sprockets 428 (Fig. 32), one of which is driven while the other idles. However, another drive means may be provided wherein both sprockets idle and the system is driven from the production line. The articles on the production line, shown in the example of Fig. 27 as automobile bodies 430, are carried upon dollys 432 which are connected to and driven by a main production line conveyor 435 (Fig. 29). Every other dolly on the production line is provided with a vertical mast 436, the upper ends of which are engageable within sockets 438. The sockets include an apex 440 for receiving the mast, and outwardly flared wing portions 441 which open rearwardly of the direction of travel of the conveyor, for guiding the upper ends of the masts 436 into the socket. The sockets are fixed to plates 442 which are hung from a pair of straps 443 connected to rollers (not shown) riding within track 405 in the same fashion as the rollers 410 on the trolleys. Thus, as the production line conveyor moves the dollys 432 the masts engage sockets 438 in the air supply system and propel the air supply loop along with the production line at a correlated rate.

Referring to Figs. 33 and 34, a modified trolley arrangement is shown which may be substituted for the trolley seen in Fig. 32. A rod-like track 450 is supported from beams 400 by a series of angle arms 452. The trolley body 455 is provided with an upper roller 456 rotating about an axle 457 screwed into body 455, and with a lower roller 458 having an axle 459 and a side roller 460 having an axle 461. The connector block 462 is preferably an integral portion at the lower end of body 455, and threadedly receives a quick acting coupler 464. A through passage 465 in block portion 462 is connected through suitable hose couplings 466 to sections of flexible conduit 468 forming a part of the air supply loop.

This modified system is driven through a cable 470 frictionally gripped within a slot 472 in trolley body 455, and the cable may be driven in any suitable manner so as to pull the trolleys along above the production line at a rate correlated with movement of the production line. At the ends of the track loop the trolleys are guided around the curves by idler pulleys, an end portion of one of which is shown at 474 in Fig. 33, and protective brackets 475 with the pans 476 may be mounted about the ends of the track loop to support the connector hose as it travels around the curved portions of the track.

It will thus be seen that the present invention provides air supply systems which are capable of continuously supplying pressure air pneumatic tools while the tools are moving along with a moving production line, enabling the use of such tools in mass production activities. The systems further provide for the use of a number of pneumatic tools at various work stations along a production line, and permit taking the tools back and forth from beginning to end in the work station without trailing long and cumbersome air supply hoses behind, and without fear of entangling such hoses in other equipment or with each other. The pneumatic tools may thus be provided with relatively short supply hoses which are quickly connected and disconnected with the system, and the supply couplers for these relatively short supply hoses are moved along in correlated relation with the production line so that at all times the worker using the pneumatic tool has ample length of supply hose for performing his work on the articles carried by the production line.

Furthermore, the pressure air conveying portions of the systems are readily accessible for repair and replacement, thus minimizing "shut down" time for the system in the event of a conduit or joint failure. This is of utmost importance in mass production activities, where a breakdown anywhere along the production line can result in losses mounting into thousands of dollars if it is not quickly remedied. The other components of the system of similar rugged and yet easily repaired construction, promoting the overall dependability and ease of maintenance.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A system for continuously supplying air under pressure to pneumatic tools to enable use thereof during movement along a production line, comprising an endless conveyor mounted in an elevated position, a plurality of couplers supported on said conveyor at intervals along the length thereof for attachment with tools used on the production line, sections of flexible conduit connecting successive said couplers into a movable air supply loop, a primary air supply connection in said loop, a stationary source of pressure air, a helical coil of flexible conduit connected at one end to said source, a supply boom, means supporting said boom for movement along the length of said conveyor, the other end of said coil being attached to said boom, a swivel connection on said boom, means confining the translatory movement of said swivel connection to linear movement along the length of said conveyor, and a conduit extending between said swivel connection and said primary air connection to maintain within said loop a supply of pressure air for pneumatic tools used on the production line and having supply hoses adapted to be connected to said couplers.

2. A system for continuously supplying motive fluid to pneumatic tools to enable use thereof on a production line, comprising an endless track, means supporting said track in an elevated position, trolley means movable along said track, means retaining said trolley means against substantial movement relative to said track in all directions other than along said track, a plurality of connector blocks rigidly supported by said trolley means at regularly spaced intervals along said track, each said block having a through passage therein, couplers attached to said blocks and communicating with said passages therein, lengths of flexible conduit connecting successive said blocks to provide a continuous air supply conduit for supplying air under pressure to said couplers, a supply boom, means supporting said boom and confining the movement thereof to a linear path along the length of said conveyor, means continuously connecting said boom to a stationary source of air under pressure, a swivel connection on said boom, and means connecting said swivel connection to said air supply conduit.

3. A system for continuously supplying motive fluid to pneumatic tools to enable use thereof on a production line, comprising an endless loop of track adapted to be supported in an elevated position, trolley means movable along said track, means retaining said trolley means against substantial movement relative to said track in all directions other than along said track, a plurality of connector blocks rigidly supported by said trolley means at regularly spaced intervals along said track, each said block having a through passage therein, couplers attached to said blocks and communicating with said passages therein, lengths of flexible conduit connecting successive said blocks to provide a continuous air supply conduit for supplying air under pressure to said couplers, a supply boom, a second track extending longitudinally of said endless track, means supporting said boom for movement along said second track, means continuously connecting said boom to a stationary source of air under pressure, and means including a swivel connector continuously connecting said boom to said air supply conduit for supplying motive fluid to pneumatic tools used on the moving production line.

4. A system for continuously supplying motive fluid to pneumatic tools to enable use thereof on a production line, comprising an endless track, means supporting said track in a substantially horizontal plane, trolley means movable along said track, means retaining said trolley means against substantial movement relative to said track in all directions other than along said track, a plurality of connector blocks rigidly hung from said trolley means at regularly spaced intervals along said track, each said block having a through passage therein, couplers attached to said blocks and communicating with said passages therein, lengths of flexible conduit connecting successive said blocks to provide a continuous air supply conduit for supplying air under pressure to said couplers, a primary air connection in said air supply conduit, a supply boom having a swivel connection to said primary air connection, means supporting said boom for movement in a linear path along the length of said track, a reel, means supporting said reel above said track, a flexible primary air conduit arranged for coiling about said reel, one end of said primary air conduit being attached to said boom, and the other end of said primary air conduit being connected to a stationary source of pressure air for continuously supplying pressure air to said air supply conduit and maintaining a moving supply of motive fluid for pneumatic tools used on the production line.

5. A system for continuously supplying motive fluid to pneumatic tools to enable use thereof on a production line, comprising a pair of endless conveyors, means supporting said conveyors side by side in an elevated position, means for moving said conveyors in unison, a plurality of connector blocks rigidly supported by each said conveyor at regularly spaced intervals thereon, each said block having a through passage therein, couplers attached to said blocks and communicating with said passages therein, lengths of flexible conduit connecting said passages in successive said blocks to provide a pair of air supply loops for maintaining air under pressure at said couplers, a primary air connector in each said loop, a boom extending between said primary air connectors and movable along therewith in correlation with movement of said conveyors, a swivel connection on said boom, said swivel connection being movable in a linear path adjacent said conveyors while said primary air connectors move around said conveyors, and means for continuously connecting said swivel connection to a stationary source of pressure air during operation of said conveyors and consequent movement of said boom.

6. A system for continuously supplying motive fluid to pneumatic tools to enable use thereof on a production line, comprising a pair of endless conveyors supported side by side in an elevated position, means for moving said conveyors in unison, a plurality of connector blocks supported by each said conveyor at regularly spaced intervals thereon, each said block having a through passage therein, couplers attached to said blocks and communicating with said passages therein, lengths of flexible conduit connecting succesive said blocks to provide a pair of air supply loops for maintaining air under pressure at said couplers, a primary air connector in each said loop, a boom extending between said primary air connectors and movable along therewith in correlation with movement of said conveyors, a swivel connection on said boom, said swivel connection being movable in a linear path adjacent said conveyors while said primary air connectors move around said conveyors, a helical coil of flexible conduit, a stationary source of pressure air connected to one end of said coil, the other end of said coil being attached to said swivel connection, and means mounting said coil between said conveyors providing for expansion and contraction of said coil during movement of said boom along with said conveyors.

7. A system for continuously supplying motive fluid to pneumatic tools to enable use thereof on a production line, comprising a pair of endless conveyors supported side by side in an elevated position, means for moving said conveyors in unison, a plurality of connector blocks supported by each said conveyor at regularly spaced intervals thereon, each said block having a through passage therein, couplers attached to said blocks and communicating with said passages therein, lengths of flexible conduit connecting successive said blocks to provide a pair of air supply loops for maintaining air under pressure at said couplers, a primary air connector in each said loop, a boom extending between said primary air connectors and movable along therewith in correlation with movement of said conveyors, a swivel connection on said boom, said swivel connection being movable in a linear path adjacent said conveyors while said primary air connectors move around said conveyors, a reel supported between said conveyors, a length of flexible conduit attached to said reel and urged into coiled position thereon, a stationary source of pressure air connected to one end of said length of conduit, and the other end thereof being attached to said swivel connection.

8. In a system for continuously supplying pressure air to pneumatic tools to enable use thereof on a moving production line, the combination of a loop of flexible conduit, connector blocks attached at regularly spaced intervals to said loop, means supporting said loop in a substantially horizontal plane and in elevated position, means retaining said connector blocks against substantial vertical movement with respect to the production line, means for moving said loop along its own length, couplers attached to said connector blocks and communicating with said loop, a primary air connector in said loop and movable therewith, a vertical air supply boom, means supporting said boom for linear movement along the length of said loop, flexible conduit means connecting said boom to said primary air connector, a stationary source of pressure air, and a helical coil of flexible conduit connected between said boom and said source for continuously supplying air to said loop through said boom.

9. In a system for continuously supplying pressure air to pneumatic tools to enable use thereof on a moving production line, the combination of a loop of flexible conduit, connector blocks attached at regularly spaced intervals to said loop, means supporting said loop in elevated position, means retaining said connector blocks against substantial vertical movement with respect to the production line, means for moving said loop along its own length, couplers attached to said connector blocks and communicating with said loop, a primary air connector in said loop and movable therewith, a vertical air supply boom, means supporting said boom and confining the movement thereof to a linear path along the length of said loop, flexible conduit means connecting said boom to said primary air connector, a stationary source of pressure air, a stationary reel supported above said loop, a length of flexible air conduit wound around said reel and attached at one end to said primary air connector, means urging said reel to rotate in a direction to wind said primary air conduit about said reel to provide for winding and unwinding of said conduit from said reel as said primary air connector moves about said loop, and the other end of said primary air conduit being connected to said source to continuously supply pressure air to said loop.

10. In a system for continuously supplying pressure air to pneumatic tools to enable use thereof on a moving production line, the combination of a loop of flexible conduit, connector blocks attached at regularly spaced intervals to said loop, means supporting said loop in an elevated position, means retaining said connector blocks against substantial vertical movement with respect to the production line, means for moving said loop along its own length, couplers attached to said connector blocks and communicating with said loop, a primary air connector in said loop and movable therewith, a vertical air supply boom, means supporting said boom and confining the movement thereof to a linear path along the length of said loop, flexible conduit means connecting said boom to said primary air connector, a stationary source of pressure air, a reel attached to said boom for movement therewith along the length of said loop, a length of flexible air supply conduit providing a primary air conduit and arranged for coiling about said reel, one end of said primary air conduit being attached to said boom, means urging said reel to rotate in a direction for wrapping said primary air conduit about said reel, and the other end of said primary air conduit being connected to said source to provide for a continuous supply of pressure air to said loop during movement of said boom and said reel along the length of said loop in following relation to movement of said primary air connector along with said loop.

11. A motive fluid supply system as in claim 2, wherein said means connecting said swivel connection to said air supply conduit includes a body having a central chamber, hanger means on said body for suspending said body from said track, means connecting said chamber into said continuous air supply conduit, means defining an annular recess surrounding one end of said body, apertures in said body for communication between said recess and said chamber, a sleeve covering said recess and mounted for rotation about said body, a length of flexible conduit extending from said swivel connection, and a connector on said sleeve attached to said length of flexible conduit providing for a continuous flow of pressure air into said continuous air supply conduit.

References Cited in the file of this patent

UNITED STATES PATENTS

| | | |
|---|---|---|
| 1,148,690 | Klingensmith | Aug. 3, 1915 |
| 2,702,149 | Harrison | Feb. 15, 1955 |
| 2,715,912 | Cameron | Aug. 23, 1955 |
| 2,720,217 | Vossbrinck | Oct. 11, 1955 |